United States Patent [19]

Laghi

[11] Patent Number: 5,066,233

[45] Date of Patent: Nov. 19, 1991

[54] QUINCUNX WITH A REARWARDLY MOVABLE BALL-STOP

[76] Inventor: Aldo A. Laghi, P.O. Box 431, Clifton Park, N.Y. 12065

[21] Appl. No.: 532,441

[22] Filed: Jun. 4, 1990

[51] Int. Cl.$^5$ ................................................ G09B 1/00
[52] U.S. Cl. .................................... 434/188; 273/109
[58] Field of Search ............... 434/188, 208, 211, 365, 434/429; 273/108, 109, 110, 111, 112, 113

[56] References Cited

U.S. PATENT DOCUMENTS 3,677,547 7/1972 Hicks ................................... 273/109
4,900,255 2/1990 Laghi ................................... 434/188

Primary Examiner—Richard J. Apley
Assistant Examiner—Rachel M. Healey
Attorney, Agent, or Firm—Schmeiser, Morelle & Watts

[57] ABSTRACT

A Quincunx type of statistics training device having an improved ball-stop apparatus. The ball-stop comprises a base member having a plurality of forwardly extending pins. The base member is spring biased in a rearward direction and a latch mechanism is used to lock the base member in a forward position. Moving of the latch member allows the ball-stop to move rearwardly and thereby release any balls which had stacked up atop its pins.

10 Claims, 2 Drawing Sheets

QUINCUNX WITH A REARWARDLY MOVABLE BALL-STOP

FIELD OF THE INVENTION

The invention is in the field of educational aids for the study of statistics. More specifically, the invention is a Quincunx apparatus that includes a modified ball-stop that greatly facilitates the manufacture and operation of the device.

BACKGROUND OF THE INVENTION

A number of visual aids are often employed in the teaching and study of statistics. These aids range from simple coins to computer generated curves and graphs. A common device specifically designed for statistical modeling is the Quincunx which was invented by Lord Francis Galton in the 1870's.

A Quincunx employs a funnel shaped conduit to direct a dropped ball into a pinplate. The pinplate includes a number of spaced rows of outwardly extending pins. Each pin is separated from its neighboring pin by a distance slightly greater than the diameter of the dropped ball. As the ball passes downwardly through the pinplate, it bounces off one pin in each row of pins.

Each row of pins represents an independent disturbance or decision point. When the ball hits one of the pins, it can then randomly fall to either the right or left side of the pin. Therefore, a dropped ball would make ten "choices" in direction if the pinplate included ten rows of pins. After passing through the last row of pins, the ball then falls into a "stacking" area.

The stacking area comprises a series of vertically extending receiving grooves or slots. As the dropped ball exits the pinplate, it falls into the slot directly below its exit point. One or more ball-stops are located across the slots and each may function to stop the ball's downward progress. The dropped balls stack up atop the ball-stop(s) and thereby illustrate the distribution which results from the decision path of the balls through the pinplate. The ball-stop(s) can be moved to a "release" position which allows the stacked balls to fall into a bottom reservoir.

A Quincunx is often used to demonstrate process capabilities or the stacking of tolerances. For example, if ten washers are to be stacked and each washer is picked at random from a supply having equal numbers of washers of two different sizes, there is a large range of possible stack heights. If the two sizes of washers are one-inch and two-inches respectively and one happens to pick ten one-inch washers, the stack height will be ten inches. If only two-inch washers are picked, the stack height will be 20 inches. Most likely however, the final stack height will be between these extremes. If a large number of washers are picked, most likely approximately one half will be of one size and the other half will be of the other size. For the above example, one would have the greatest probability of picking five, one-inch washers and five, two-inch washers. Therefore, the probable stack height would be fifteen inches.

A Quincunx could be used to illustrate the above example. A single ball would be dropped from the funnel shaped conduit into a pinplate having ten rows of pins. Each row of pins represents one pick of a washer. If the ball falls to the right, this would represent choosing a two-inch washer. If the ball falls to the left, this represents a one-inch washer being chosen.

Below the pinplate would be located ten grooves or slots labeled "10" through "20" respectively with the left most groove being labeled "10". These grooves would represent the final stack height.

Dropping a large number of balls into the pinplate would simulate an equally large number of washer stackings. The balls would stack up in the grooves below the pinplate and illustrate the distribution of probable stack heights. The balls collected in the grooves would eventually fall into a bell shaped pattern called a "normal" or "Gaussian" distribution. In this example, the top of the curve would most likely be located in the groove marked "15" and this would indicate that the most probable stack height would be 15 inches.

Once all the balls have passed through the pinplate and are stacked in the grooves, the distribution experiment is complete. When it is time to run a new cycle, the movable ball-stop is briefly moved to its "release" position and the balls fall downwardly into the bottom ball reservoir. The balls may now be relocated into the top reservoir or additional balls may be released from the top reservoir to again rest atop the movable ball-stop.

The prior art movable ball-stop has been the source of numerous manufacturing and operational difficulties. The ball-stop is basically a long narrow rod slidably received within a horizontal groove in the main support body of the device. On the rod's outer face are located a plurality of slots equal in number and size to the ball receiving grooves. When in the "release" position, the slots are aligned with the grooves and the balls are free to travel downwardly to the lower ball reservoir or to the next ball-stop. When the ball-stop is moved to its "stop" position, the sidewalls of the slots are aligned with the center of the grooves and thereby prevent downward ball movement. One end of the ball-stop extends past the sidewall of the device and thereby acts as a handle to facilitate its side-to-side movement. The primary design criteria for the stop is that it must be easy to operate and that it must be capable of acting on all of the grooves simultaneously. In addition, the stop must be able to freely slide in the groove with only a minimum of play. Since a Quincunx is normally made predominantly from wood, shrinkage and expansion of the wood must be considered when sizing the horizontal slot that receives the ball-stop. For structural reasons, the wood used in a Quincunx is oriented so that the grains run vertically, from top to bottom. This greatly exacerbates the problems associated with the expansion of the wood. Additional expansion problems arise when the ball-stop is made of a material with a dissimilar grain orientation or expansion coefficient compared to the groove into which it fits.

To allow for the noted material expansion characteristics, the horizontal groove must be sized with a very tight tolerance to allow the ball-stop to slide freely yet have only a minimum of vertical play. If the groove and stop member are not made within the tight tolerances required, the balls may not readily fall past the stop when the stop is in the "release" position. It should be noted that when the stop is in the "release" position, it is pushed inwardly from the handle until it reaches a built in limit-stop. If the placement of the limit-stop is inexact or if the ball-stop has slightly expanded, the slots in the ball-stop will not align with the grooves in the Quincunx. If this should occur, it becomes virtually impossible to move the balls into the bottom ball reservoir. Also, due to expansion, the stop itself may stick in place and be difficult to operate.

SUMMARY OF THE INVENTION

The invention is an improved ball-stop apparatus that avoids the tight tolerance manufacturing procedures required by the prior art. The improved ball-stop moves in a direction substantially perpendicular to the face of the Quincunx. It comprises a base member having a plurality of pins extending outwardly from one face. The pins fit through complementary holes in the face of the Quincunx. The base member is spring biased in a rearward direction away from the face of the Quincunx and a latch mechanism is employed to releasably lock the ball-stop in its "stop" position. Releasing of the latch allows the ball-stop to move rearwardly into a "release" position in which the pins are retracted from the vertical grooves on the face of the Quincunx.

The improved ball-stop is simple to manufacture and to operate. Since the pins are not required to be a tight fit within the complementary holes, wide manufacturing tolerances may be employed.

DETAILED DESCRIPTION OF THE DRAWINGS

Figure 1:
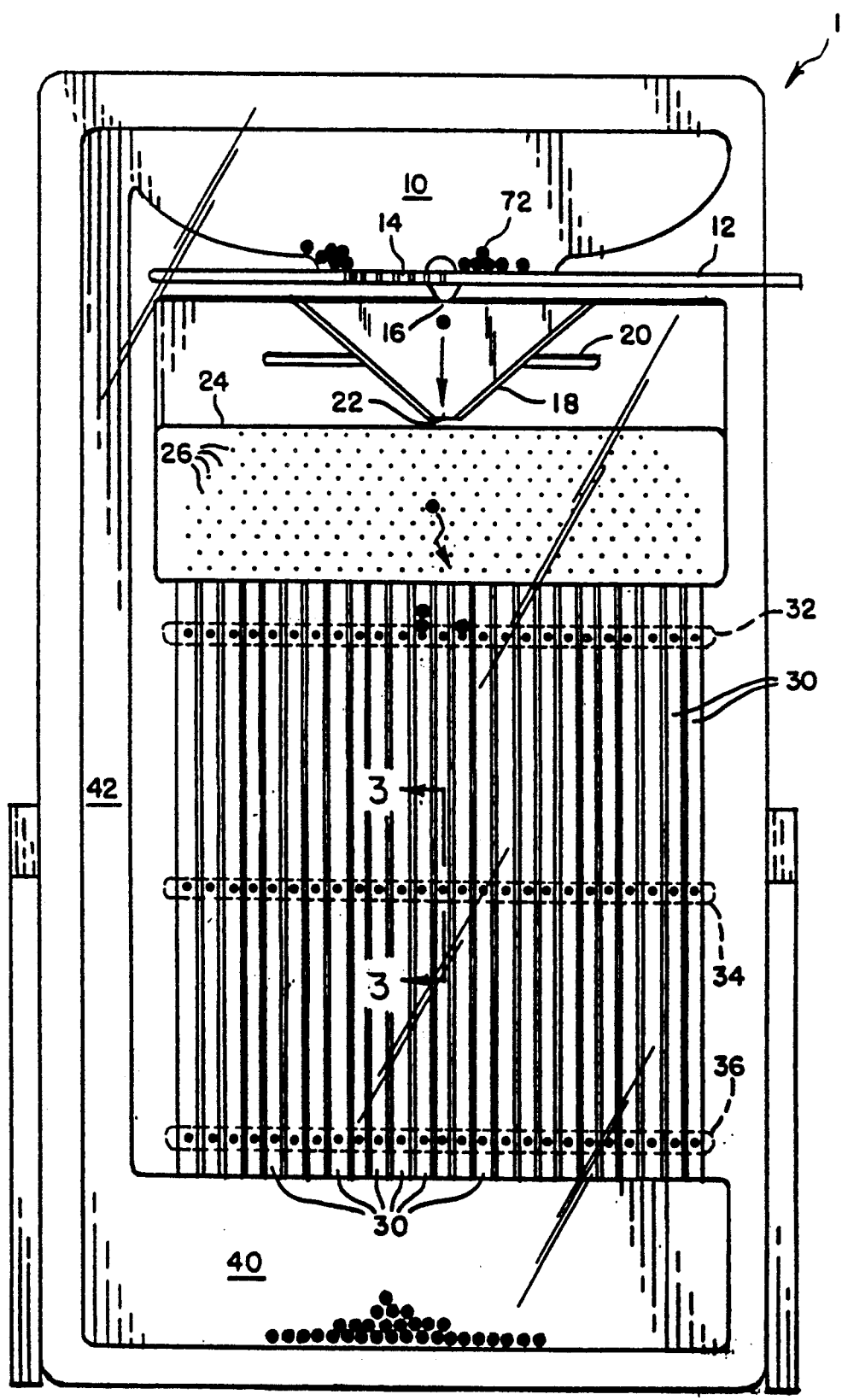
FIG. 1 is a front view of a Quincunx device in which three ball-stops are shown.

Referring now to the drawings in greater detail, wherein like reference characters refer to like parts throughout the several figures, there is shown by the numeral 1 a Quincunx type of statistics teaching device. FIG. 1 provides a front view of the device. In this figure, it can be seen that the device incorporates a number of distinct portions that are oriented in a line from top to bottom. At the top, there is an upper ball reservoir 10. A feeder member 12 is situated below the reservoir and includes a plurality of slots 14 located along the outer edge of its center portion. Below the feeder member is an orifice 16 that leads to a movable, funnel shaped conduit 18.

The conduit 18 may be moved across the face of the device and includes a rearwardly extending handle (not shown) that passes through slot 20. At the bottom end of the conduit is an opening 22.

Below the opening 22 is a pinplate 24. The pinplate comprises a plurality of pinrows 26 wherein each pin is horizontally spaced from its neighboring pin by a distance greater than the diameter of the balls to be used in the device. The pinplate is normally mounted in a manner in which it can be easily removed so that other pinplates having different numbers of pinrows may be substituted in its place.

As the ball leaves the pinplate, it falls downwardly into one of the elongated grooves 30. The ball's downward progress may be halted by any one of the three ball-stops 32, 34 or 36. Each of the ball-stops is movable from a first "stop" position in which the ball is stopped from passing past the ball-stop to a second "release" position in which the ball may freely pass the ball-stop.

In the first, or "stop" position, balls will stack up in the grooves above the ball-stop. As the balls stack up, they will form a normal or Gaussian distribution above the ball-stop due to the action of the pinplate. When the operator wishes, the balls can be allowed to pass the ball-stop by moving the ball-stop to its second or "release" position.

Once the balls have been released by ball-stop 36, they fall into a bottom ball reservoir 40. Here the balls are collected until the operator wishes to move them into the top ball reservoir 10. There is a side passageway 42 connecting the two reservoirs and proper angling of the device allows the balls to travel through the passageway.

Figure 2:
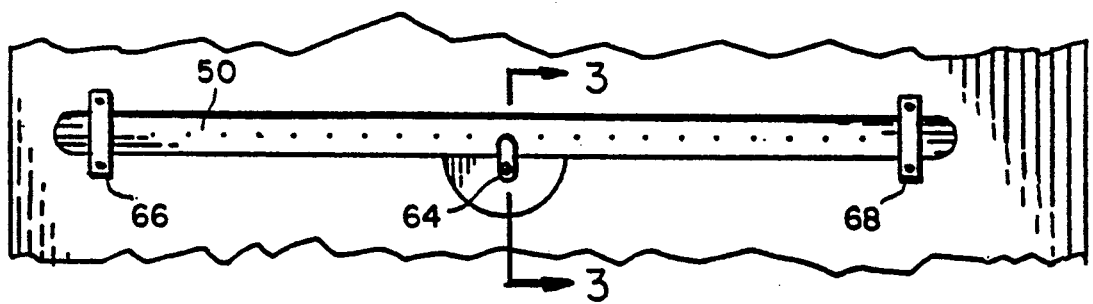
FIG. 2 is a rear view of a portion of the Quincunx of FIG. 1 showing the rear of one of the ball-stops.
Figure 3:
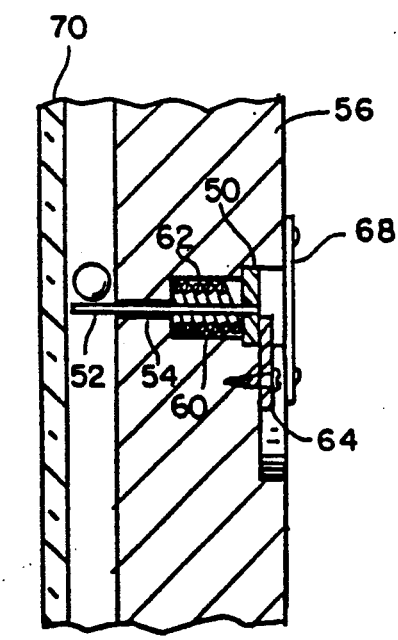
FIG. 3 is a cross-sectional view of the Quincunx portion shown in FIG. 2 with the ball-stop in its "stop" position.
Figure 4:
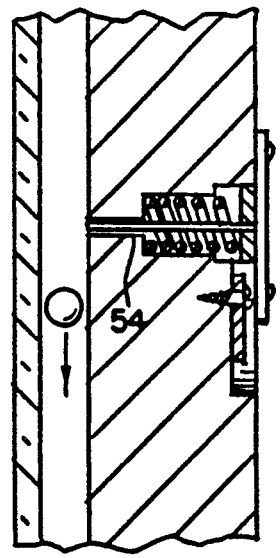
FIG. 4 is a cross-sectional view of the Quincunx ball-stop in its "release" position.

In FIGS. 2-4, the ball-stop mechanism is shown in greater detail. FIG. 2 shows a rear view of one of the ball-stops and FIG. 3 shows a cross-sectional view of the same ball-stop mechanism. FIG. 4 shows in cross-section the ball-stop in its "release" position.

In the figures, it can be seen that the ball-stop comprises an elongated, rod-like base member 50. Extending forwardly from the base member are a plurality of pins 52 that pass through a complementary row of holes 54 located in the front portion of the Quincunx main support body 56. The holes allow the pins to extend into the grooves 30 in such a manner whereby they prevent the downward passage of balls through the grooves. This is shown in FIG. 3.

In FIGS. 3 and 4, a spring 60 can be seen which is used to bias the base member in a rearward direction. This spring is placed around one or more of the pins. In one alternative embodiment (not shown), the spring is located on a separate rod member that would be mounted parallel to the pins and extend rearwardly from the support body and pass through the base member. Another alternative embodiment (not shown) makes use of additional bores in the support body that can retain a rear portion of a spring and allow the front portion of the spring to contact the base member.

In the embodiment shown in FIG. 3, the spring 60 is received within a bore 62 that encircles one of the pins 52. The spring is shown in a compressed state which is maintained by a latch member 64.

The latch member 64 is pivotally attached to the rear surface of the support body. When the latch is in the position shown in FIG. 3, it maintains the base member 50 in the forward "stop" position with the pins extending out of the holes 54. Moving the latch to the "release" position, shown in FIG. 4, allows the base member to move rearwardly due to the spring force. In its rearwardmost position, the pins are fully received within the holes 54 and the balls are allowed to pass the ball-stop in an unobstructed manner.

FIGS. 2-4 also show the presence of retainers 66 and 68. These retainers are fastened to the support body and each lie adjacent an end of the ball-stop's base member. These retainers act as a stop to limit the base member's rearward travel once the latch 64 has been moved to the "release" position.

The Quincunx will normally be positioned in a vertical manner so that the force of gravity can move the balls in a downward direction. To keep the balls within the device, a sheet of transparent plastic 70 (seen in FIGS. 1, 3 and 4) is fastened to the front face of the support body.

In operation, one would begin with a large number of balls 72 located in the top reservoir. If one wanted to illustrate an example with ten repetitions, the feeder bar would be shifted right and then left until ten balls were captured by one of feeder's slots 14 and released downwardly into the orifice 16. From the orifice, each ball would pass through the conduit 18 and fall downwardly into the pinplate region. As each ball contacts a pin, a random event would be represented. If a pinplate having ten rows of pins was in use, each trial (ball) would experience ten random events. The result of the trial is illustrated by the location in which the ball exits from the pinplate. The ball then falls into a groove directly below it's pinplate exit position and is stopped by the first ball-stop that is in the "stop" position. Normally, all three ball-stops would be in the "stop" position at the beginning of an experiment. Therefore, in this example all ten balls would be stacked atop the first ball-stop 32. The stacking would most likely resemble a "bell" or "normal" distribution.

At this point, an instructor might wish to illustrate that the greater the number of balls used, the more accurate the results. He or she would then move the latch for ball-stop 32 into a "release" position and the ball-stop would move rearwardly and allow the stacked balls to move freely down to the next ball-stop 34. The instructor would then relatch the ball-stop 32 into its "stop" position and again release ten balls from the upper reservoir to travel downwardly through the pinplate. Again, the balls would stack up atop the ball-stop 32. At this point, any dissimilar distributions above ball-stops 32 and 34 can be discussed.

Next, the instructor would again move ball-stop 32 into a "release" position and there would then be an additive effect of distributions atop ball-stop 34 since there would now be twenty balls stacked on the second ball-stop.

The above trials can be repeated and the third ball-stop can be used in a similar manner to isolate portions of the total distribution.

Finally, any of the ball-stops located below the balls can be placed in the "release" position and thereby allow all of the balls located below the top reservoir 10 to fall into the bottom reservoir 40. At this point, the Quincunx can be tipped and inverted thereby allowing the balls to travel through the side passageway 42 up to the top reservoir 10. The Quincunx would then be returned to its normal upright position and it would be again ready for use.

The improved ball-stops are simple to operate and move in a positive fashion between their two positions. Due to the method of operation of the ball-stop apparatus, the holes 54 may be made much larger than the pins 52 without any detrimental effects. Also, the slot that receives the ball-stop base member may be made larger than the base member with no detremental effect on the ball-stop's operation. Due to this allowable wide tolerance for fit, a high degree of manufacturing skill and commensurate costs are avoided. It should be noted that any number of ball-stops may be used in a Quincunx with the number being dependent on the user's needs to isolate portions of a total distribution. The materials required for the ball-stop base member may either be the same as used for the support body (wood) or, since the ball-stop base is somewhat hidden from the viewer, a plastic or metal material may be used.

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention.

I claim:
1. A statistics training device comprising:
    a support member;
    a ball conduit means located on a top portion of said support member;
    a pinplate means located on a front face of said support member below said ball conduit means;
    a plurality of elongated groove means located on said support member below said pinplate means;
    at least one ball-stop means located on said support member below at least a portion of said grooves, said ball-stop means comprising a plurality of pins mounted on a base member that can be moved in a manner which allows said pins to move from a first position wherein said pins at least partially block said groove means to a second position wherein said pins are withdrawn from said groove means and are moved rearwardly toward a rear face of said support means; and
    a ball reservoir located on said support member below said at least one ball-stop means; wherein said ball-stop means further comprises at least one spring which biases said base member in one direction.
2. The device in claim 1 wherein said spring biases said base member in a rearward direction toward said rear face of said support member.
3. The device of claim 1 wherein said pins of said ball-stop means are located within complementary holes that are located on a front portion of said device.
4. The device of claim 1 wherein said ball-stop means further comprises a latch means mounted on said support member for releasably locking said ball-stop base member into a single position.
5. The device of claim 4 wherein when said latch means locks said ball-stop base member into said first position, the pins mounted on said base member protrude into the elongated grooves.
6. The device of claim 1 further comprising at least one retainer means which functions to limit the rearward movement of said base member.
7. The device of claim 1 wherein said base member is constrained in a manner whereby it can only move in a direction substantially perpendicular to the front face of the support member.
8. An improved Quincunx type statistics training device, said device comprising an upper ball conduit which leads to a pinplate and a plurality of elongated grooves located below said pinplate, the improvement comprising:
    a ball-stop means also located below said pinplate, said ball-stop means comprising a row of holes located laterally across said grooves and a series of movable pins located within said holes, said pins being movable from a first position wherein they at least partially block said grooves to a second position wherein they are fully received within said holes and thereby do not obstruct said grooves; wherein said ball-stop means further comprises a spring means which biases said pins toward their second position.
9. The device of claim 8 wherein said ball-stop means further comprises a latch means which can releasably lock said pins in said first position.
10. The device of claim 9 wherein said ball-stop means further comprises a retainer means for retaining to the device a base member into which said movable pins are mounted.

* * * * *